(12) United States Patent
Lin et al.

(10) Patent No.: US 11,100,190 B2
(45) Date of Patent: Aug. 24, 2021

(54) CHROMEBOOK COMPUTER AND WEBVR EXECUTION METHOD THEREOF

(71) Applicant: Acer Incorporated, New Taipei (TW)

(72) Inventors: Shih-Hao Lin, New Taipei (TW); Chao-Kuang Yang, New Taipei (TW); Wen-Cheng Hsu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/833,028

(22) Filed: Mar. 27, 2020

(65) Prior Publication Data
US 2020/0320157 A1    Oct. 8, 2020

(30) Foreign Application Priority Data

Apr. 3, 2019   (TW) .................................. 108111983

(51) Int. Cl.
*G06F 3/048*    (2013.01)
*G06F 16/958*    (2019.01)
(Continued)

(52) U.S. Cl.
CPC ........ *G06F 16/986* (2019.01); *G06F 9/44526* (2013.01); *G06F 9/54* (2013.01); *H04L 67/38* (2013.01); *H04N 13/344* (2018.05)

(58) Field of Classification Search
CPC ...... G06F 16/986; G06F 9/44526; G06F 9/54; H04N 13/344; H04L 67/38
See application file for complete search history.

(56) References Cited

U.S. PATENT DOCUMENTS 9,262,396 B1 *   2/2016   Rodriguez Valadez ..................... G06F 16/957
10,395,117 B1 *  8/2019   Zhang ................ G06K 9/00671
(Continued)

FOREIGN PATENT DOCUMENTS

CN     106200974 A     12/2016
CN     108877310 A     11/2018
(Continued)

OTHER PUBLICATIONS

Anonymous, "Acer VR Utility for Chrome Browser WebVR Guide", Dec. 19, 2018, 14 pages.
(Continued)

*Primary Examiner* — David Phantana-angkool
(74) *Attorney, Agent, or Firm* — Birch, Stewart, Kolasch & Birch LLP

(57) ABSTRACT

A Chromebook computer and a web virtual reality (WebVR) execution method thereof are provided. The WebVR execution method of Chromebook computer includes the following steps. A Chrome Extension informs a WebVR website that the Chromebook computer has a WebVR execution capability. A Chrome APP obtains an inertial measurement unit (IMU) data of a head-mounted display (HMD). The Chrome APP transmits the IMU data to the Chrome Extension. The Chrome Extension transmits the IMU data to the WebVR website through a WebVR application programming interface (API). The Chrome Extension captures a left eye frame and a right eye frame from the WebVR website through the WebVR API. The Chrome Extension projects the left eye frame and the right eye frame to the HMD.

17 Claims, 5 Drawing Sheets

(51) Int. Cl.
*H04N 13/344* (2018.01)
*G06F 9/445* (2018.01)
*G06F 9/54* (2006.01)
*H04L 29/06* (2006.01)

(56) References Cited

U.S. PATENT DOCUMENTS

| | | | | |
|---|---|---|---|---|
| 2011/0022571 | A1* | 1/2011 | Snyder | G06F 9/44526 |
| | | | | 707/692 |
| 2013/0282755 | A1* | 10/2013 | Procopio | G06F 16/13 |
| | | | | 707/770 |
| 2014/0114845 | A1 | 4/2014 | Rogers et al. | |
| 2016/0142264 | A1* | 5/2016 | Sahi | H04L 12/42 |
| | | | | 370/254 |
| 2017/0104928 | A1* | 4/2017 | Chase | H04N 5/247 |
| 2019/0005716 | A1 | 1/2019 | Singh et al. | |
| 2019/0028691 | A1* | 1/2019 | Hinds | H04N 21/4518 |
| 2020/0050256 | A1* | 2/2020 | Yamamoto | G06F 3/017 |

FOREIGN PATENT DOCUMENTS

| | | | |
|---|---|---|---|
| CN | 106200974 B | * | 5/2019 |
| TW | 201809970 A | | 3/2018 |
| TW | 201839593 A | | 11/2018 |

OTHER PUBLICATIONS

Extended European Search Report dated Aug. 5, 2020 for Application No. 20106691.4.
Yoo et al., "WebVR—Bringing Virtual Reality to the Web", Chungbuk National University, Computer Graphics and Contents lab, Apr. 26, 2011, 46 pages.

* cited by examiner

CHROMEBOOK COMPUTER AND WEBVR EXECUTION METHOD THEREOF

This application claims the benefit of Taiwan application Serial No. 108111983, filed Apr. 3, 2019, the subject matter of which is incorporated herein by reference.

BACKGROUND OF THE INVENTION

Field of the Invention

The invention relates in general to a computer and a web virtual reality (WebVR) execution method thereof, and more particularly to a Chromebook computer and a WebVR execution method thereof.

Description of the Related Art

Although many head-mounted displays (HMDs) available in the market provide web virtual reality (WebVR) function, not every operating system can support this function. For example, the Operating system of Chromebook computer does not support any HMD so far, therefore the users of Chromebook computer cannot use WebVR. Particularly the educational institutions using the Chromebook cannot execute WebVR, and their teaching resources are subjected to some limitations. Therefore, how to enable the Chromebook computer to execute WebVR has become a prominent task for the industries.

SUMMARY OF THE INVENTION

The present invention relates to a Chromebook computer and a web virtual reality (WebVR) execution method thereof, which enable the Chromebook computer to execute WebVR with the design of a Chrome Extension and a Chrome APP.

According to an embodiment of the present invention, a WebVR execution method of Chromebook computer is provided. The WebVR execution method of Chromebook computer includes the following steps. A Chrome Extension informs a WebVR website that the Chromebook computer has a WebVR execution capability. A Chrome APP obtains an inertial measurement unit (IMU) data of a head-mounted display (HMD). The Chrome APP transmits the IMU data to the Chrome Extension. The Chrome Extension transmits the IMU data to the WebVR website through a WebVR application programming interface (API). The Chrome Extension captures a left eye frame and a right eye frame from the WebVR website through the WebVR API. The Chrome Extension projects the left eye frame and the right eye frame to the HMD.

According to another embodiment of the present invention, a Chromebook computer is provided. The Chromebook computer includes a Chrome Extension and a Chrome APP. The Chrome Extension is configured to inform a WebVR website that the Chromebook computer has a WebVR execution capability. The Chrome APP is configured to obtain an IMU data of an HMD. The Chrome APP transmits the IMU data to the Chrome Extension. The Chrome Extension transmits the IMU data to the WebVR website through a WebVR application programming interface (WebVR API). The Chrome Extension captures a left eye frame and a right eye frame from the WebVR website through the WebVR API, and projects the left eye frame and the right eye frame to the HMD.

The above and other aspects of the invention will become better understood with regards to the following detailed description of the preferred but non-limiting embodiment(s). The following description is made with reference to the accompanying drawings.

DETAILED DESCRIPTION OF THE INVENTION

Figure 1:
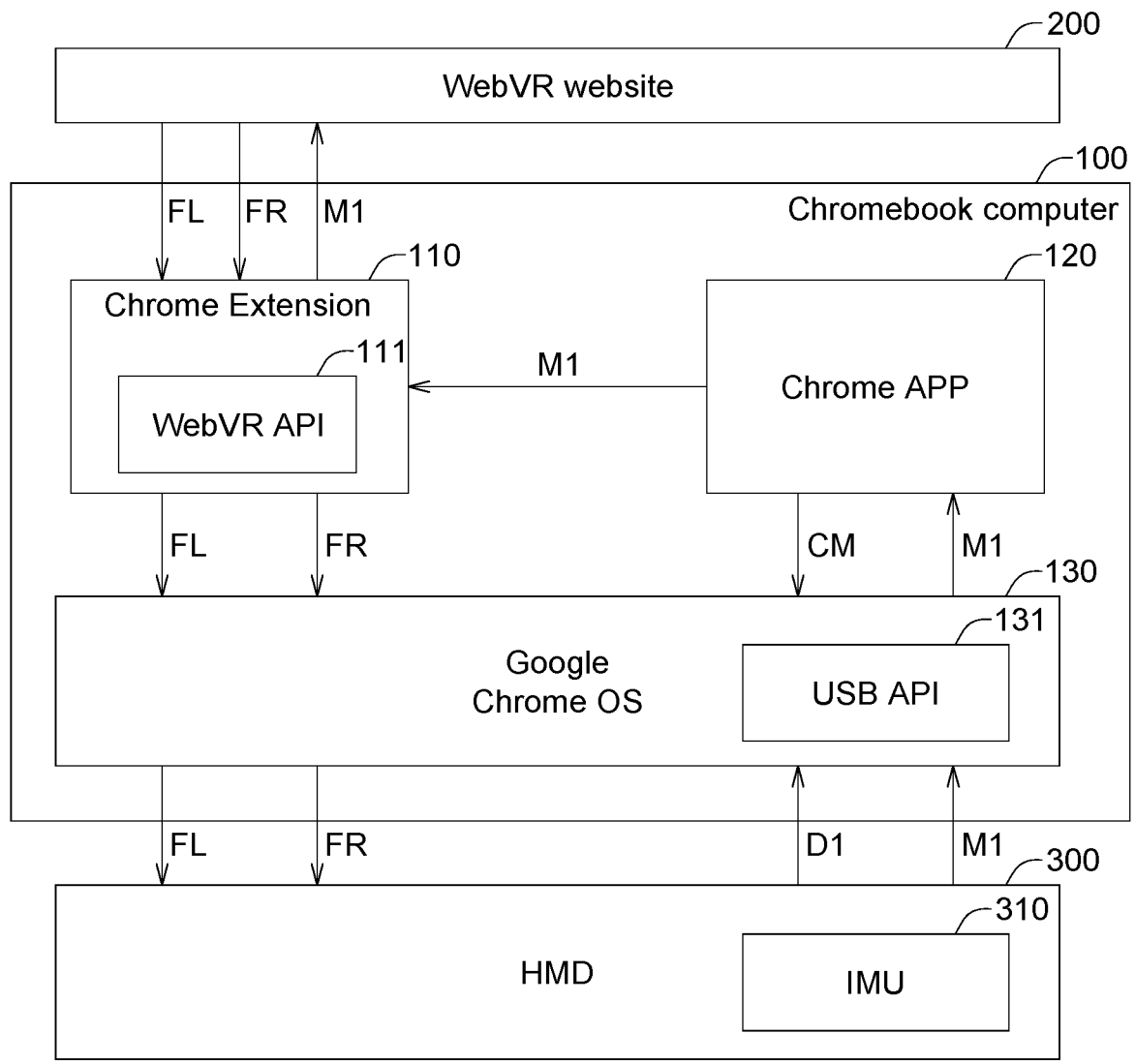
FIG. 1 is a schematic diagram of a Chromebook computer according to an embodiment.

Referring to FIG. 1, a schematic diagram of a Chromebook computer 100 according to an embodiment is shown. The Chromebook is a personal computer installed with a Google Chrome operating system (OS) 130. The Chromebook, having the features of notebook computer and the concept of cloud computing, is currently the most popular education designated notebook computer in the United States. In the present embodiment, for the Chromebook computer 100 to execute WebVR, the Chromebook computer 100 is installed with a Chrome Extension 110 and a Chrome APP 120. The main function of the Chrome APP 120 is to access data from the HMD 300 through a universal serial bus application programming interface (USB API) 131 of the Google Chrome operating system 130, and then transmit the accessed data to the Chrome Extension 110 by using the Chrome message passing technology.

The main function of the Chrome Extension 110 is to enable the Chrome Extension 110 to realize WebVR and receive data from the HMD 300, and then transmit the received data to the WebVR website 200 through the WebVR API 111. Thus, the WebVR API 111 can capture a left eye frame FL and a right eye frame FR from the WebVR website 200 and then project the left eye frame FL and the right eye frame FR to the HMD 300. Details of the WebVR execution method of the Chromebook computer 100 according to an embodiment are disclosed below with accompanying drawings.

Figure 2:
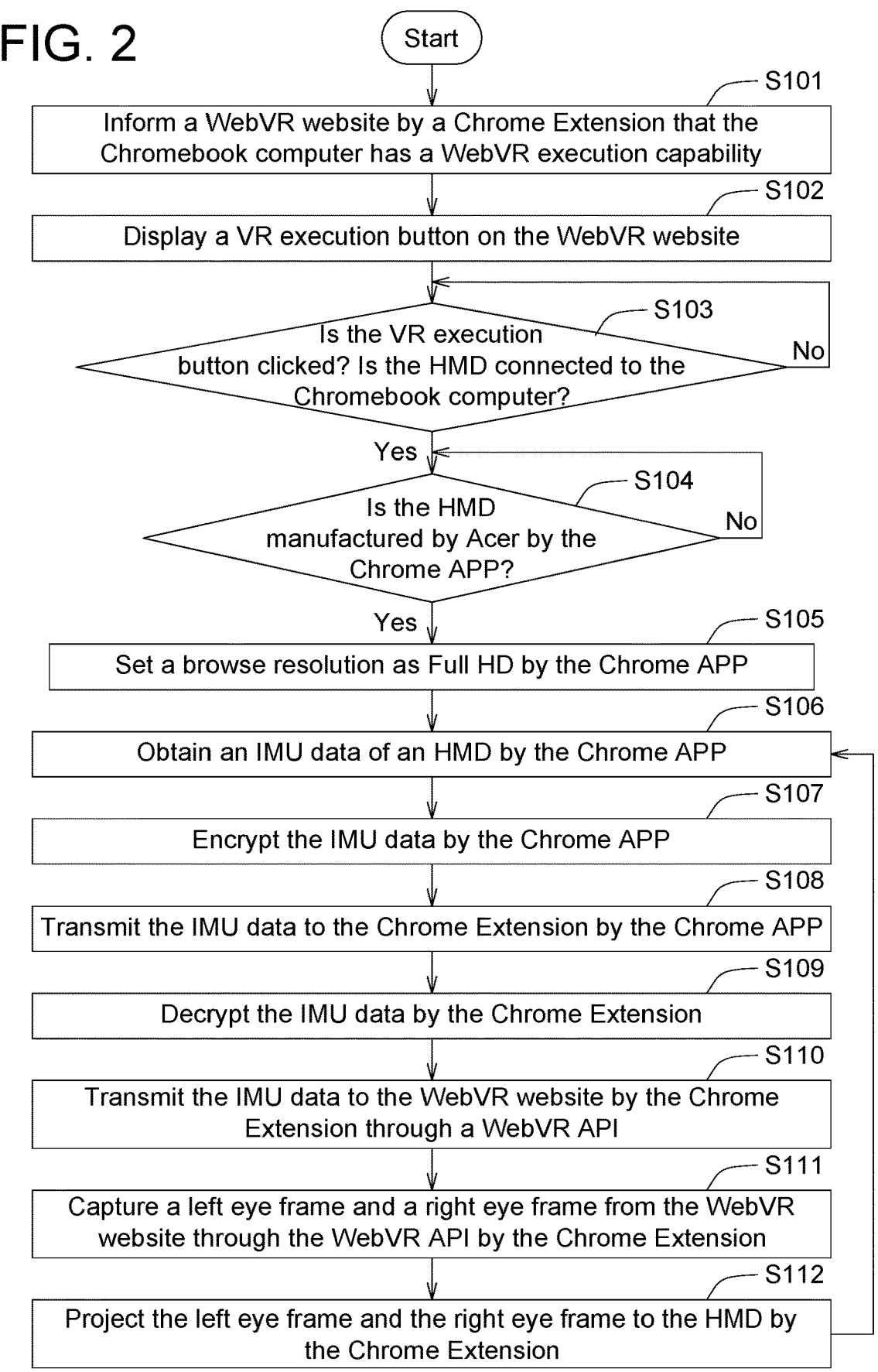
FIG. 2 is a flowchart of a WebVR execution method of Chromebook computer according to an embodiment.

Referring to FIG. 2, a flowchart of a WebVR execution method of Chromebook computer 100 according to an embodiment is shown. In step S101, a Chrome Extension 110 informs a WebVR website 200 that the Chromebook computer 100 has a WebVR execution capability. The conventional Chromebook computer does not have the WebVR execution capability. In the present step, the Chrome Extension 110 informs the WebVR website 200 that the Chromebook computer 100 currently browsing the WebVR website 200 has a WebVR execution capability.

Figure 3:
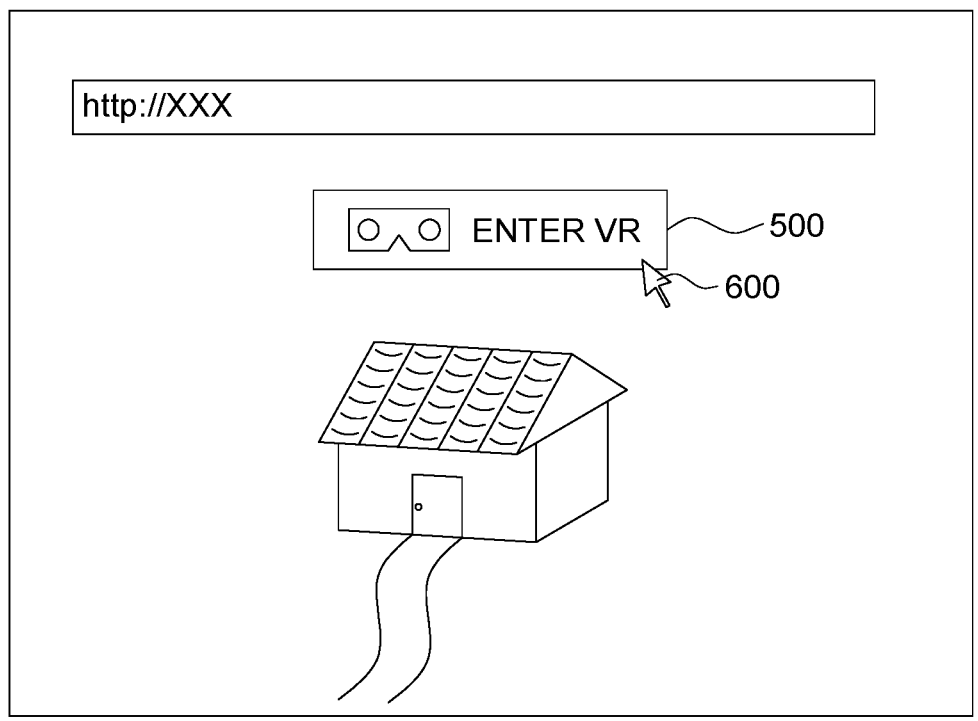
FIG. 3 is a schematic diagram of a VR execution button.

Next, the method proceeds to step S102, the WebVR website 200 displays a VR execution button 500 (illustrated in FIG. 3). Referring to FIG. 3, a schematic diagram of a VR execution button 500 is shown. When the WebVR website 200 is informed that the Chromebook computer 100 currently connected thereto has a WebVR execution capability, the WebVR website 200 displays the VR execution button 500, and starts to display a VR content once the user clicks the VR execution button 500 with a cursor 600. In another embodiment, the WebVR website 200 can directly display the VR content without displaying the VR execution button 500 beforehand (that is, step S102 is skipped).

In step S103, whether the VR execution button 500 is clicked and whether the HMD 300 is connected to the Chromebook computer 100 are determined. If it is determined that the VR execution button 500 has been clicked and the HMD 300 has been connected to the Chromebook computer 100, then the method proceeds to step S104. If it is determined that the VR execution button 500 has not been clicked or the HMD 300 has not been connected to the Chromebook computer 100, then the method returns to step S103. In another embodiment, step S103 only needs to determine whether the HMD 300 has been connected to the Chromebook computer 100 and does not need to determine whether the VR execution button 500 has been clicked.

In step S104, the Chrome APP 120 identifies whether the HMD 300 is manufactured by the Acer Inc. according to the identification code (ID) D1 of the HMD 300. The ID D1 is such as a vendor ID (VID) or a product ID (PID). If the HMD 300 is manufactured by the Acer Inc., then the method proceeds to step S105. If the HMD 300 is not manufactured by the Acer Inc., then the method returns to step S104. That is, the WebVR execution method of the present embodiment is executed only when the HMD 300 is manufactured by the Acer Inc. In another embodiment, step S104 can be omitted, and every HMD 300 is allowed to perform the WebVR execution method of the present embodiment.

In step S105, the Chrome APP 120 sets a browse resolution as Full HD by using a control signal CM. In the present step, the resolution of each eye of the HMD 300 can be 1440×1440, and the Chrome APP 120 reduces the resolution of each eye frame to 1080×1080. Thus, the processing loading of the Google Chrome operating system 130 can be reduced. In another embodiment, step S105 can be omitted, and the original resolution is used.

In step S106, the Chrome APP 120 obtains an inertial measurement unit data (IMU data) M1 of an inertial measurement unit (IMU) 310 of the HMD 300 through the USB API 131 of the Google Chrome operating system 130. The IMU data M1 can be a variable data with 3 degrees of freedom.

Then, the method proceeds to step S107, the Chrome APP 120 encrypts the IMU data M1. The encrypted IMU data M1 can reduce the risk of data stealing and can compress the data to reduce its volume.

Afterwards, the method proceeds to step S108, the Chrome APP 120 transmits the IMU data M1 to the Chrome Extension 110 by using the Chrome message passing technology.

Then, the method proceeds to step S109, the Chrome Extension 110 decrypt the IMU data M1. In an embodiment, step S107 and step S109 can omit the encryption/decryption procedure.

Afterwards, the method proceeds to step S110, the Chrome Extension 110 transmits the IMU data M1 to the WebVR website 200 through a WebVR application programming interface (WebVR API) 111.

Then, the method proceeds to step S111, the Chrome Extension 110 captures a left eye frame FL and a right eye frame FR from the WebVR website 200 through the WebVR API 111 according to the IMU data M1.

Afterwards, the method proceeds to step S112, the Chrome Extension 110 projects the left eye frame FL and the right eye frame FR to the HMD 300. That is, the Chrome Extension 110 captures a left eye frame FL and a right eye frame FR according to the rotation direction of the user's head and further projects the left eye frame FL and the right eye frame FR to the HMD 300 to bring the user to an environment of three-dimensional panoramic image.

Through the execution method, the Chromebook computer 100 can execute WebVR to provide a WebVR to the user. Particularly, if the educational institutions using the Chromebook computer 100 can execute WebVR, the teaching resources will be greatly enlarged.

Figure 4:
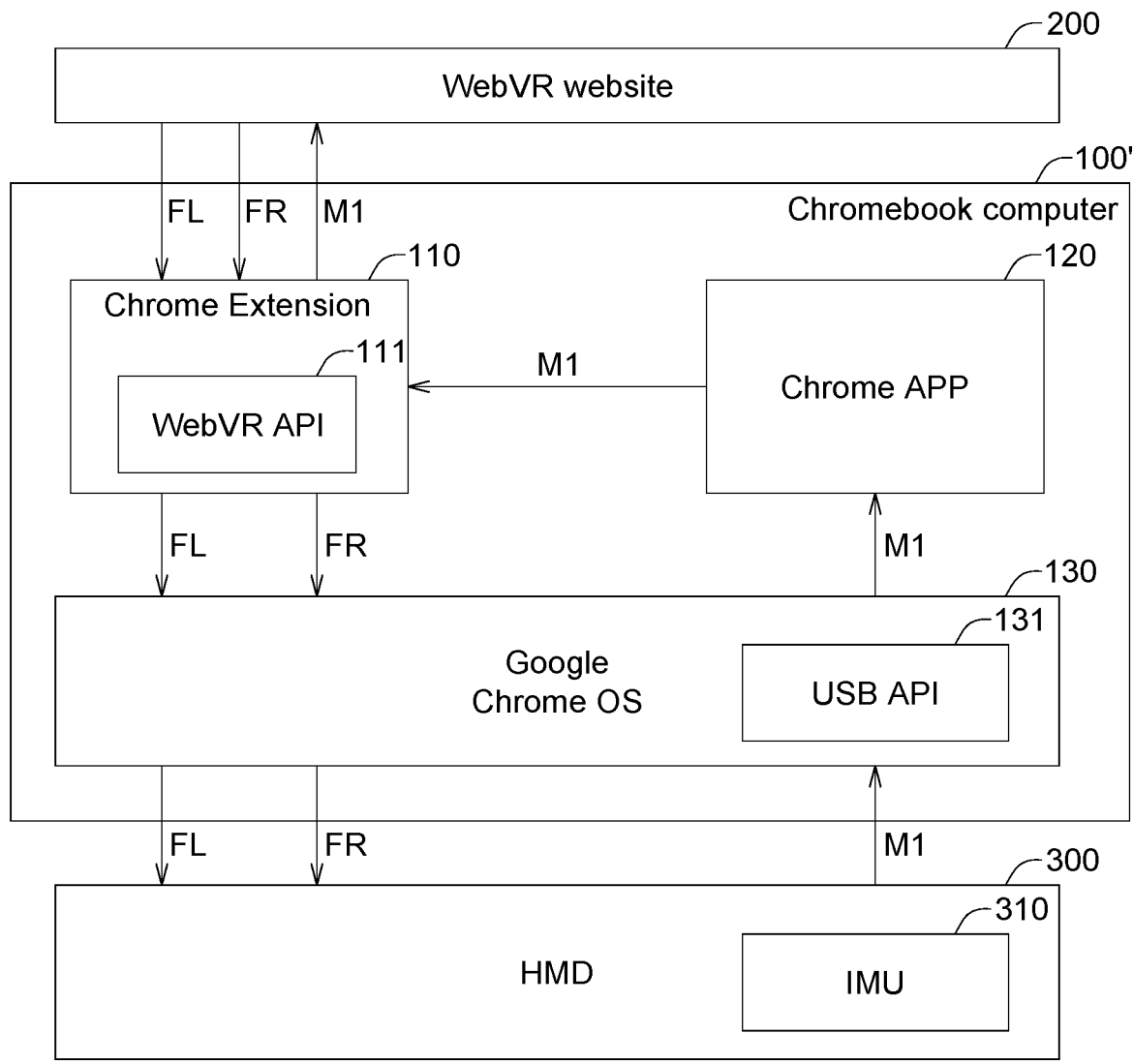
FIG. 4 is a schematic diagram of a Chromebook computer according to another embodiment.
Figure 5:
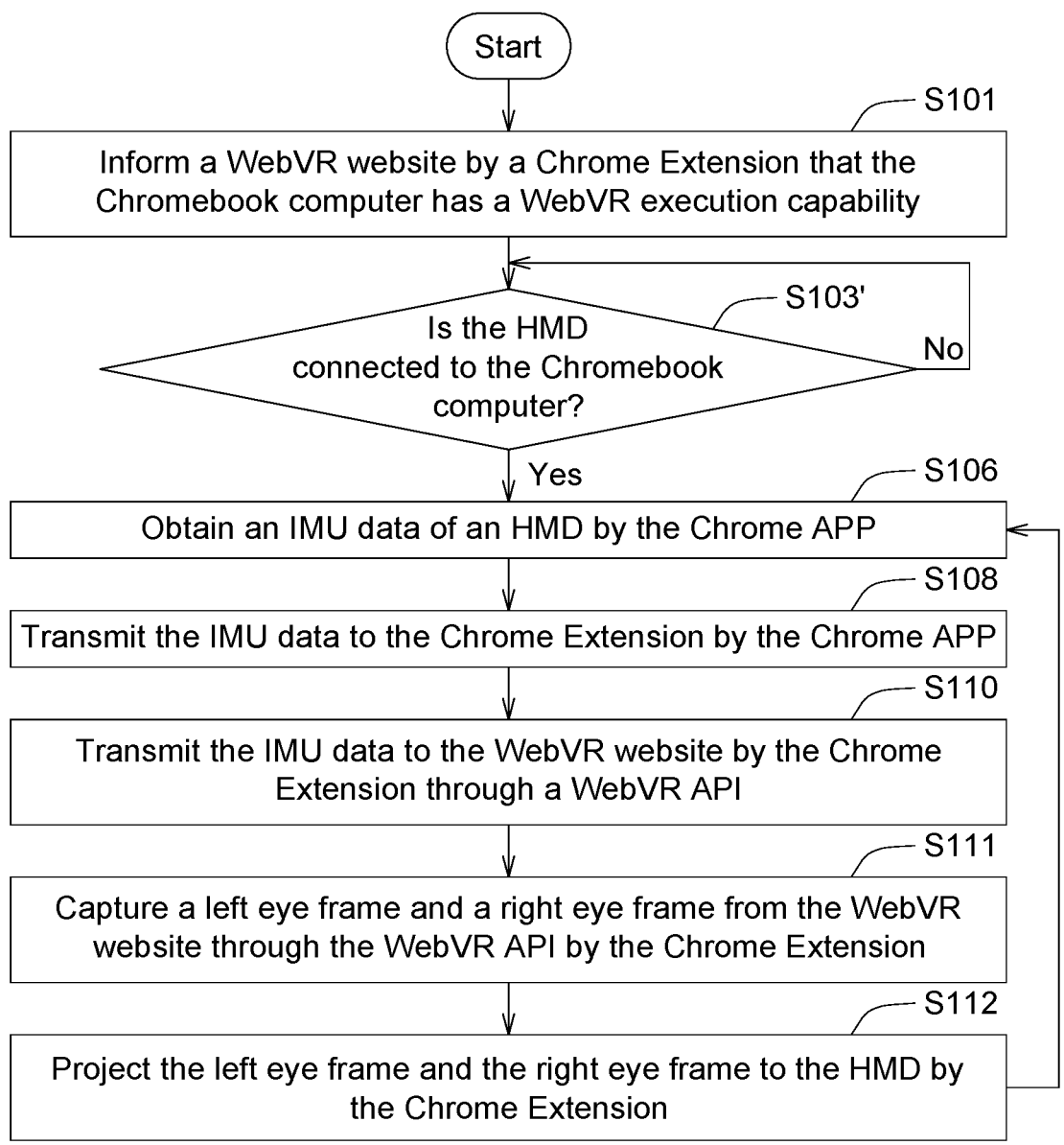
FIG. 5 is a flowchart of a WebVR execution method of Chromebook computer.

Refer to FIG. 4 and FIG. 5. FIG. 4 is a schematic diagram of a Chromebook computer 100' according to another embodiment. FIG. 5 is a flowchart of a WebVR execution method of Chromebook computer 100'. In the present embodiment, although some steps are omitted in the WebVR execution method of the Chromebook computer 100', the Chromebook computer 100' still has a WebVR execution capability.

In step S101, the Chrome Extension 110 informs the WebVR website 200 that the Chromebook computer 100' has a WebVR execution capability. The WebVR website 200, having been informed that the Chromebook computer 100' has a WebVR execution capability, can directly display the VR content.

In step S103', whether the HMD 300 has been connected to the Chromebook computer 100' is determined. If it is determined that the HMD 300 has been connected to the Chromebook computer 100', then the method proceeds to step S106. If it is determined that the HMD 300 has not been connected to the Chromebook computer 100', then the method returns to step S103'.

In step 106, the Chrome APP 120 obtains an inertial measurement unit data (IMU data) M1 of the HMD 300 through the USB API 131 of the Google Chrome operating system 130. The IMU data M1 can be a variable data with 3 degrees of freedom.

Afterwards, the method proceeds to step S108, the Chrome APP 120 transmits the IMU data M1 to the Chrome Extension 110 by using the Chrome message passing technology.

Then, the method proceeds to step S110, the Chrome Extension 110 transmits the IMU data M1 to the WebVR website 200 through a WebVR API 111.

Afterwards, the method proceeds to step S111, the Chrome Extension 110 captures a left eye frame FL and a right eye frame FR from the WebVR website 200 through the WebVR API 111 according to the IMU data M1.

Afterwards, the method proceeds to step S112, the Chrome Extension 110 projects the left eye frame FL and the right eye frame FR to the HMD 300. That is, the Chrome Extension 110 captures a left eye frame FL and a right eye frame FR according to the rotation direction of the user's head and further projects the left eye frame FL and the right eye frame FR to the HMD 300 to bring the user to an environment of three-dimensional panoramic image.

Through the execution method, the Chromebook computer 100' can execute WebVR to provide WebVR to the user. Particularly, if the educational institutions using the Chromebook computer 100' can execute WebVR, the teaching resources will be greatly enlarged.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A web virtual reality (WebVR) execution method of Chromebook computer, comprising:
   informing a WebVR website by a Chrome Extension that the Chromebook computer has a WebVR execution capability;
   setting a browse resolution as Full HD by a Chrome APP, wherein a resolution of each eye of the HMD is 1440×1440, and the Chrome APP reduces the resolution of each of a left eye frame and a right eye frame to 1080×1080;
   obtaining an inertial measurement unit data (IMU data) of a head-mounted display (HMD) by the Chrome APP;
   transmitting the IMU data to the Chrome Extension by the Chrome APP;
   transmitting the IMU data to the WebVR website by the Chrome Extension through a WebVR application programming interface (WebVR API);
   capturing the left eye frame and the right eye frame from the WebVR website through the WebVR API by the Chrome Extension; and
   projecting the left eye frame and the right eye frame to the HMD by the Chrome Extension.

2. The WebVR execution method of Chromebook computer according to claim 1, further comprising:
   displaying a VR execution button on the WebVR website.

3. The WebVR execution method of Chromebook computer according to claim 2, further comprising:
   determining whether the VR execution button is clicked and whether the HMD is connected to the Chromebook computer.

4. The WebVR execution method of Chromebook computer according to claim 1, further comprising:
   encrypting the IMU data by the Chrome APP; and
   decrypting the IMU data by the Chrome Extension.

5. The WebVR execution method of Chromebook computer according to claim 1, further comprising:
   identifying the HMD by the Chrome APP according to an identification code (ID) of the HMD, wherein the ID is a vendor ID (VID) or a product ID (PID).

6. The WebVR execution method of Chromebook computer according to claim 1, wherein in the step of transmitting the IMU data to the Chrome Extension by the Chrome APP, the Chrome APP transmits the IMU data to the Chrome Extension by using a Chrome message passing technology.

7. The WebVR execution method of Chromebook computer according to claim 1, wherein the IMU data is a variable data with 3 degrees of freedom.

8. The WebVR execution method of Chromebook computer according to claim 1, wherein in the step of projecting the left eye frame and the right eye frame to the HMD by the Chrome Extension, the Chrome Extension captures the left eye frame and the right eye frame according to the rotation direction of a user's head and further projects the left eye frame and the right eye frame to the HMD.

9. A Chromebook computer, comprising:
   a Chrome Extension configured to inform a WebVR web site that the Chromebook computer has a WebVR execution capability; and
   a Chrome APP configured to obtain an IMU data of an HMD, and set a browse resolution as Full HD, wherein a resolution of each eye of the HMD is 1440×1440, and the Chrome APP reduces the resolution of each of a left eye frame and a right eye frame to 1080×1080;
   wherein the Chrome APP transmits the IMU data to the Chrome Extension; the Chrome Extension transmits the IMU data to the WebVR website through a WebVR application programming interface (WebVR API); the Chrome Extension captures the left eye frame and the right eye frame from the WebVR website through the WebVR API and projects the left eye frame and the right eye frame to the HMD.

10. The Chromebook computer according to claim 9, wherein the Chrome Extension informs a WebVR website; the Chromebook computer has the WebVR execution capability, which enables the WebVR website to display a VR execution button.

11. The Chromebook computer according to claim 10, wherein whether the VR execution button is clicked and whether the HMD is connected to the Chromebook computer are determined.

12. The Chromebook computer according to claim 9, wherein the Chrome APP is further configured to encrypt the IMU data; the Chrome Extension is further configured to decrypt the IMU data.

13. The Chromebook computer according to claim 9, wherein the Chrome APP further identifies the HMD according to an identification code (ID) of the HMD; the ID is a vendor ID (VID) or a product ID (PID).

14. The Chromebook computer according to claim 9, wherein the Chrome APP transmits the IMU data to the Chrome Extension by using a Chrome message passing technology.

15. The Chromebook computer according to claim 9, wherein the IMU data is a variable data with 3 degrees of freedom.

16. The Chromebook computer according to claim 9, wherein the Chrome Extension captures the left eye frame and the right eye frame according to the rotation direction of a user's head and further projects the left eye frame and the right eye frame to the HMD.

17. A web virtual reality (WebVR) execution method of Chromebook computer, comprising:
   informing a WebVR website by a Chrome Extension that the Chromebook computer has a WebVR execution capability;
   setting a browse resolution as Full HD by a Chrome APP, wherein each eye of the HMD has a first resolution, and the Chrome APP sets a first resolution of each of a left eye frame and a right eye frame to a second resolution which is lower than the first resolution;
   obtaining an inertial measurement unit data (IMU data) of a head-mounted display (HMD) by the Chrome APP;
   transmitting the IMU data to the Chrome Extension by the Chrome APP;
   transmitting the IMU data to the WebVR website by the Chrome Extension through a WebVR application programming interface (WebVR API);
   capturing the left eye frame and the right eye frame from the WebVR website through the WebVR API by the Chrome Extension; and
   projecting the left eye frame and the right eye frame to the HMD by the Chrome Extension.

* * * * *